United States Patent [19]
Hirano et al.

[11] Patent Number: 5,021,724
[45] Date of Patent: Jun. 4, 1991

[54] CONTROLLING APPARATUS FOR INDUCTION MOTOR

[75] Inventors: Yasuhiro Hirano; Mitunori Yamashina, both of Hitachi; Tetsuo Etoh, Takahagi, all of Japan

[73] Assignee: Hitachi, Ltd., Tokyo, Japan

[21] Appl. No.: 609,760

[22] Filed: Nov. 7, 1990

[30] Foreign Application Priority Data

Nov. 25, 1989 [JP] Japan .................................. 1-305795

[51] Int. Cl.⁵ .............................................. H02P 5/40
[52] U.S. Cl. ..................................... 318/800; 318/807; 318/805; 318/721
[58] Field of Search ................ 318/798, 799, 723, 721, 318/727, 734, 800, 801, 802, 803, 804, 805, 806, 807, 808, 809, 810, 812, 811

[56] References Cited

U.S. PATENT DOCUMENTS

| | | | |
|---|---|---|---|
| 4,292,531 | 9/1981 | Williamson | 318/798 |
| 4,361,794 | 11/1982 | Kawada et al. | 318/801 |
| 4,680,526 | 6/1987 | Okuyama et al. | 318/808 |
| 4,792,741 | 12/1988 | Matsuo et al. | 318/805 |
| 4,818,927 | 4/1989 | Hino et al. | 318/807 |

FOREIGN PATENT DOCUMENTS 60-14593 4/1985 Japan .

*Primary Examiner*—William M. Shoop, Jr.
*Assistant Examiner*—J. W. Cabeca
*Attorney, Agent, or Firm*—Antonelli, Terry, Stout & Kraus

[57] ABSTRACT

A controlling apparatus for an induction motor for controlling the induction motor in high efficiency having a converter for supplying an electric power to the induction motor, a rotational speed detector of the induction motor, a controlling means of the converter for holding a torque of the induction motor constant while the rotational speed of the induction motor is lower than a base rotational speed and to decrease a secondary magnetic flux of the induction motor according to the rotational speed while the rotational speed of the induction motor is over the base rotational speed, and a means for varying the secondary magnetic flux according to a terminal voltage of the induction motor so as to hold the terminal voltage a predetermined constant voltage while the rotational speed of the induction motor is higher than the predetermined speed.

7 Claims, 3 Drawing Sheets

5,021,724

CONTROLLING APPARATUS FOR INDUCTION MOTOR

BACKGROUND OF THE INVENTION

The present invention relates to a controlling apparatus for an induction motor.

In the general controlling apparatus for an induction motor the induction motor is controlled so as to keep a rotational torque of the motor constant when the motor speed is lower than a base rotational speed of the motor and to keep a output of the induction motor constant when the motor speed is higher than the base rotational speed. The rotational torque constant control is attained by holding secondary magnetic flux constant when the rotational speed of the motor is lower than the base rotational speed and the output constant control is performed by decreasing the secondary magnetic flux in inverse proportion to the rotational speed of the motor when the rotational speed is higher than the base speed. In the controlling apparatus for the induction motor, a terminal voltage of the induction motor is changed depending on a load of the induction motor and a maximum value of the terminal voltage of the induction motor is controlled so as not to exceed a maximum voltage which is output by a cycloconverter connected to the induction motor when the induction motor is driven with a maximum load at maximum rotational speed. Therefore the terminal voltage of the induction motor is controlled having a sufficient margin of the voltage so as to be very low usually and the efficiency of the induction motor becomes very low too. The Japanese published Patent No. 60-14593 (1985) is cited as an example of such apparatus.

SUMMARY OF THE INVENTION

The present invention has been accomplished to overcome the above mentioned problem of the conventional technique.

An object of present invention is to control the induction motor so as to be driven in high efficiency.

In order to attain the above object, the secondary magnetic flux of the induction motor is controlled so as to be constant in a lower range than a predetermined rotational speed of the motor and to be decreased according to the rotational speed of the motor and a peak value of the terminal voltage of the induction motor, wherein the peak value is calculated from the detected terminal voltage of the induction motor or an reference voltage of the induction motor. Furthermore the peak value of the terminal voltage of the induction motor may be simulated as a function of the rotational speed.

DETAILED DESCRIPTION OF THE PREFERRED EMBODIMENTS

An embodiment showing a total construction of a diagrammatic view showing an embodiment of a controlling apparatus for an induction motor in the present invention will be explained using FIG. 1.

Figure 1:
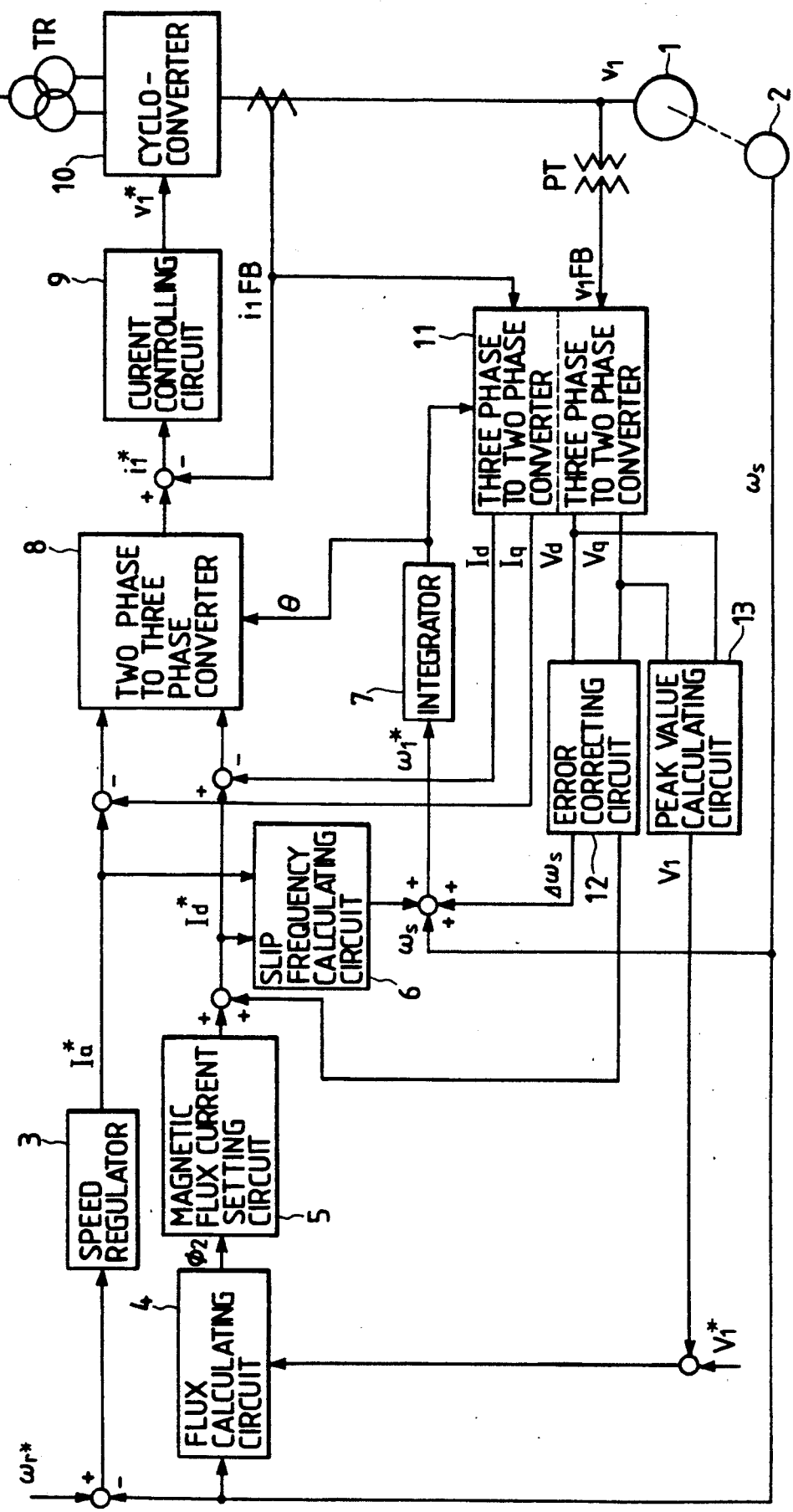
FIG. 1 is a diagrammatic view showing an embodiment of a controlling apparatus for an induction motor in the present invention.

In FIG. 1, numeral 1 denotes a induction motor, 2 a rotational speed detector. The rotational speed detector 2 coupled to the induction motor outputs a speed feedback signal $\omega_r$ and a speed regulator 3 outputs a torque current reference signal $I_q{}^*$ according to an error between the speed feedback signal $\omega_r$ and a rotational speed reference signal $\omega_r{}^*$. A magnetic flux calculating circuit 4 generates secondary magnetic flux $\phi_2$ according to the speed feedback signal $\omega_r$ and a exciting current setting circuit 5 outputs a exciting current reference signal $I_d{}^*$ based on the magnetic flux $\phi_2$. A slip frequency calculating circuit 6 outputs a slip frequency $\omega_s{}^*$ and a primary current in the induction motor 1 which is determined based on a sum of the slip frequency $\omega_s$ and the speed feedback signal $\omega_r$. A integrator 7 outputs a phase $\theta$ of a primary current of the induction motor 1 based on the speed feedback signal $\omega_r$ and a two phase to three phase converter 8 outputs a current reference value $i_f{}^*$ based on differences respectively between the torque current reference signals $I_q{}^*$ and a q axis current component $I_q$ and the magnetic flux current ordering signals $I_d{}^*$ and a d axis current component $I_d$ by comparing with the phase $\theta$. A current control circuit 9 outputs a terminal voltage ordering signal $v_f{}^*$ based on a difference between the current ordering value $i_f{}^*$ and a primary current feedback signal $i_{fFB}$ of the induction motor 1 so as to control a cycloconverter 10 and supply a primary current to the induction motor 1. A primary voltage feedback signal $v_{lFB}$ of the induction motor 1 is detected by a voltage detector PT and converted into the d axis voltage $V_d$ and the q axis voltage $V_q$ by a three phase to two phase converter 11. A slip frequency error $\Delta\omega_s$ is generated from a error correcting circuit 12 based on the d axis voltage $V_d$ and the q axis voltage $V_q$ and corrects the frequency $\omega_1{}^*$ of a primary current of the induction motor. The primary current feedback signal $i_{lFB}$ of the induction motor 1 is converted to the d axis current component $I_d$ and the q axis current component $I_q$ by the three phase to two phase converter 11. A code TR is a transformer for supplying a electric power to the cycloconverter 10.

In this embodiment shown in FIG. 1, a technical feature of the present invention is in a magnetic flux decreasing control of the induction motor 1 which vary the secondary magnetic flux of the induction motor 1 according to the rotational speed N of the induction motor and peak value $V_l$ of the terminal voltage of the induction motor 1 so as to make the peak value $V_l$ hold a maximum output voltage $V_{max}$ of the cycloconverter 10. In the general control system of the induction motor, the terminal voltage of the induction motor is controlled so as to be pretty lower than the maximum output voltage $V_{max}$ and so as not to excess the maximum output voltage $V_{max}$ while the secondary magnetic flux of the induction motor is controlled so as to be decreased in a maximum rotational speed $N_t$ and in a normal maximum load. Therefore, the secondary magnetic flux decreasing control system of the present invention as stated above drives the induction motor 1 with a higher efficiency than the general control system which decreases the secondary magnetic flux according to only the rotational speed. Because the peak value $V_l$ of the terminal voltage $v_l$ of the induction motor 1 in the present invention is controlled so as to hold the maximum output voltage $V_{max}$ of the cycloconverter 10 in the range of the magnetic flux decreasing control of the induction motor 1.

A peak value calculating circuit 13 in FIG. 1 calculates a peak value $V_l$ of the terminal voltage $v_l$ of the induction motor 1 from the d axis voltage $V_d$ and q axis voltage $V_q$ from the three phase to two phase convertor 11 based on a following equation.

$$V_1 = \sqrt{V_d^2 + V_q^2}$$

A secondary magnetic flux pattern of the magnetic flux calculating circuit 4 which is varied in inverse proportion to the rotational speed N of the induction motor 1 is changed according to the peak value $V_l$ of the detected terminal voltage $v_l$ of the induction motor 1 so that the peak value $V_l$ correspond to the maximum output voltage $V_{max}$ of the cycloconverter 10. That is to say, the secondary magnetic flux pattern of the magnetic flux calculating circuit 4 is varied based on the rotational speed N and the peak value $V_l$ of the detected terminal voltage $v_l$ of the induction motor 1 so that the peak value $V_l$ is controlled to correspond to the maximum output voltage $V_{max}$ of the cycloconverter 10 when the induction motor 1 is controlled so as to decrease the secondary magnetic flux based on the rotational speed.

Figure 2:
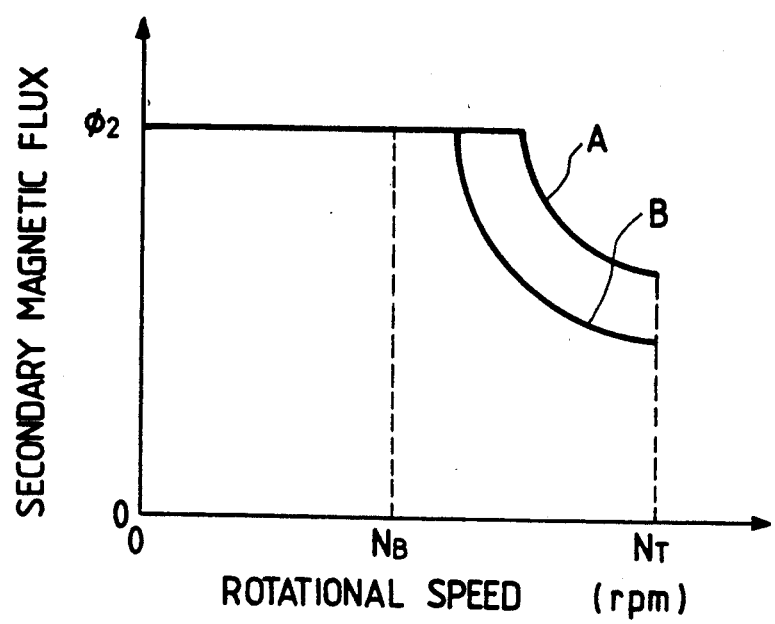
FIGS. 2 and 3 are schematic diagrams showing characteristics of the embodiment in FIG. 1.
Figure 3:
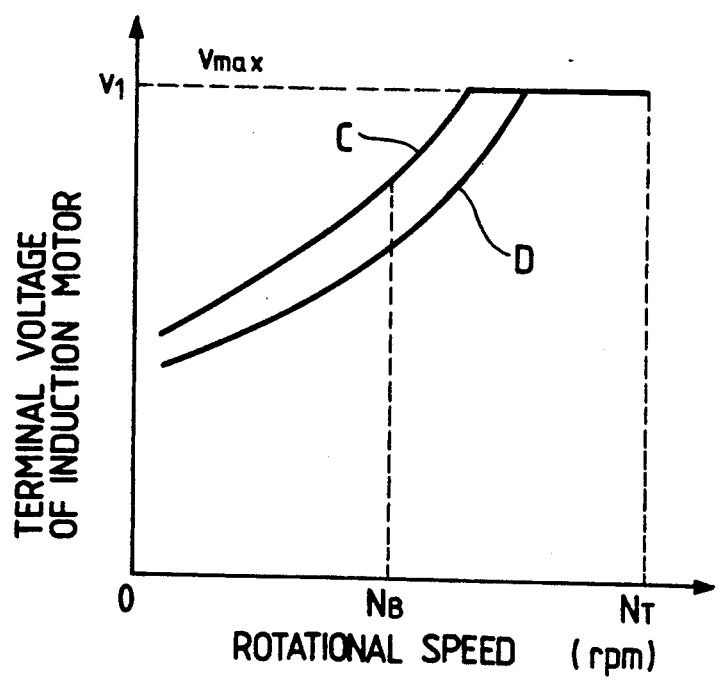

The secondary magnetic flux $\phi_2$ is controlled so as to hold a constant value as shown in FIG. 2 and a torque of the induction motor 1 becomes constant when the rotational speed N of the induction motor 1 is under the base rotational speed $N_B$ and in this stage the terminal voltage of the induction motor 1 is controlled according to the rotational speed of the motor 1 so as to be varied as a curve D when the induction motor 1 is driven with 100% load and so as to be varied as a curve C when the induction motor 1 is driven with a maximum load as shown in FIG. 3. And when the secondary magnetic flux $\phi_2$ is controlled so as to be decreased as a curve A at the 100% load and as a curve B at the maximum load as shown in FIG. 2 in a range over the base rotational speed $N_B$, the peak value $V_l$ of the terminal voltage $v_l$ of the induction motor 1 is controlled so as to hold the maximum output voltage $V_{max}$ of the cycloconverter 10 as shown in FIG. 3.

As stated above in the present invention, as the induction motor 1 is driven by holding the terminal voltage higher while the induction motor 1 is controlled so as to decrease the secondary magnetic flux according to the rotational speed, the induction motor 1 in the present invention is controlled in higher efficiency and a total power factor of the induction motor drive system is improved.

Figure 4:
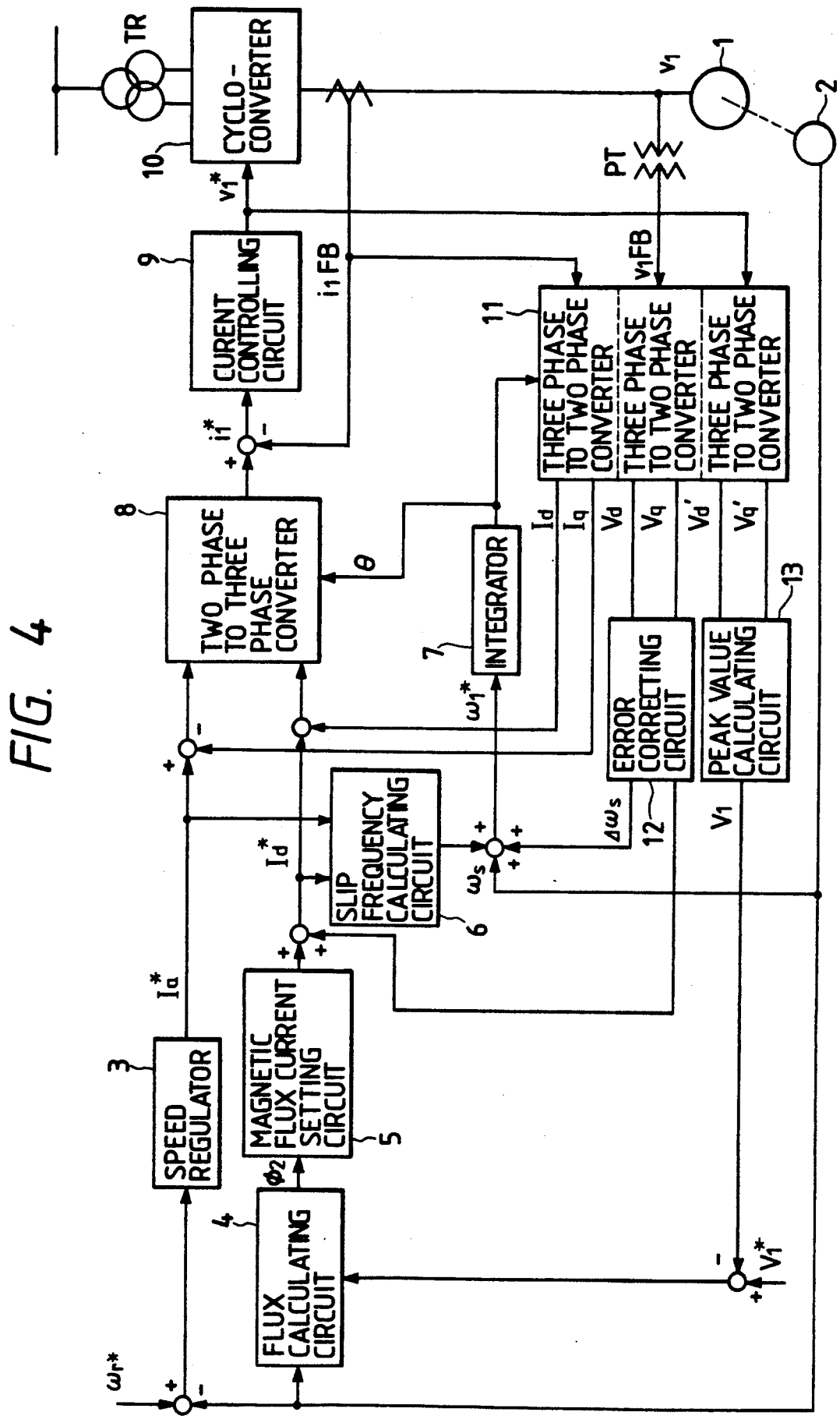
FIG. 4 is a schematic diagram showing an another embodiment of the present invention.

FIG. 4 shows an another embodiment of a controlling apparatus for the induction motor in the present invention. In this embodiment, a voltage reference signal $v_l^*$ fed to the cycloconverter 10 is detected in stead of detecting the terminal voltage of the induction motor 1. That is to say, the three phase to two phase converter 11 converts the voltage ordering signal $v_l^*$ into a d axis voltage $V_d'$ and a q axis voltage $V_q'$ and the peak value calculating circuit 13 in FIG. 4 calculates the peak value $V_l$ of the terminal voltage $v_l$ of the induction motor 1 by using the d axis voltage $V_d'$ and q axis voltage $V_q'$ generated from the three phase to two phase converter 11 based on a following equation.

$$V_1 = \sqrt{V_d'^2 + V_q'^2}$$

The secondary magnetic flux of the induction motor 1 is controlled as the curve A or B shown in FIG. 2 and the terminal voltage of the induction motor 1 is controlled so as to hold the maximum output voltage $V_{max}$ and the embodiment shown in FIG. 4 attains same merit as that in the embodiment shown in FIG. 1.

Furthermore in the present invention, the secondary magnetic flux of the induction motor 1 is controlled as the curve A or B shown in FIG. 2 may be simulated by detecting the rotational speed of the induction motor 1 without detected the terminal voltage $v_l$ or the voltage reference signal $v_l^*$.

We claim:

1. A controlling apparatus for an induction motor comprising,
    an induction motor,
    a converter for supplying an electric power to the induction motor,
    a detector for detecting a rotational speed of the induction motor,
    a means for controlling the converter so as to hold a torque of the induction motor constant while the rotational speed of the induction motor is lower than a predetermined speed and to decrease a secondary magnetic flux of the induction motor according to the rotational speed while the rotational speed of the induction motor is over the predetermined speed, and
    a means for varying the secondary magnetic flux according to a terminal voltage of the induction motor so as to hold the terminal voltage a predetermined constant voltage while the rotational speed of the induction motor is higher than the predetermined speed.

2. A controlling apparatus for an induction motor as defined in claim 1 characterized in that,
    said means for varying the secondary magnetic flux calculates a peak value of the terminal voltage of the induction motor which is detected and varies the secondary magnetic flux based on the peak value.

3. A controlling apparatus for an induction motor as defined in claim 1 characterized in that,
    said means for varying the secondary magnetic flux is a simulator for simulating the secondary magnetic flux according to the terminal voltage so as to hold the terminal voltage the predetermined constant voltage by detecting the rotational speed.

4. A controlling apparatus for an induction motor as defined in claim 1 characterized in that,
    said means for varying the secondary magnetic flux detects load of the induction motor and varies the secondary magnetic flux based on the load.

5. A controlling apparatus for an induction motor as defined in claim 1 characterized in that,
    said means for varying the secondary magnetic flux holds the terminal voltage to a maximum output voltage of the converter while the rotational speed of the induction motor is over the predetermined speed.

6. A controlling apparatus for an induction motor as defined in claim 1 characterized in that,
    said mans for varying the secondary magnetic flux varies the secondary magnetic flux according to a detected terminal voltage of the induction motor.

7. A controlling apparatus for an induction motor as defined in claim 1 characterized in that,
    said means for varying the secondary magnetic flux varies the secondary magnetic flux according to an ordering output voltage of the converter.

* * * * *